Patented Jan. 14, 1936

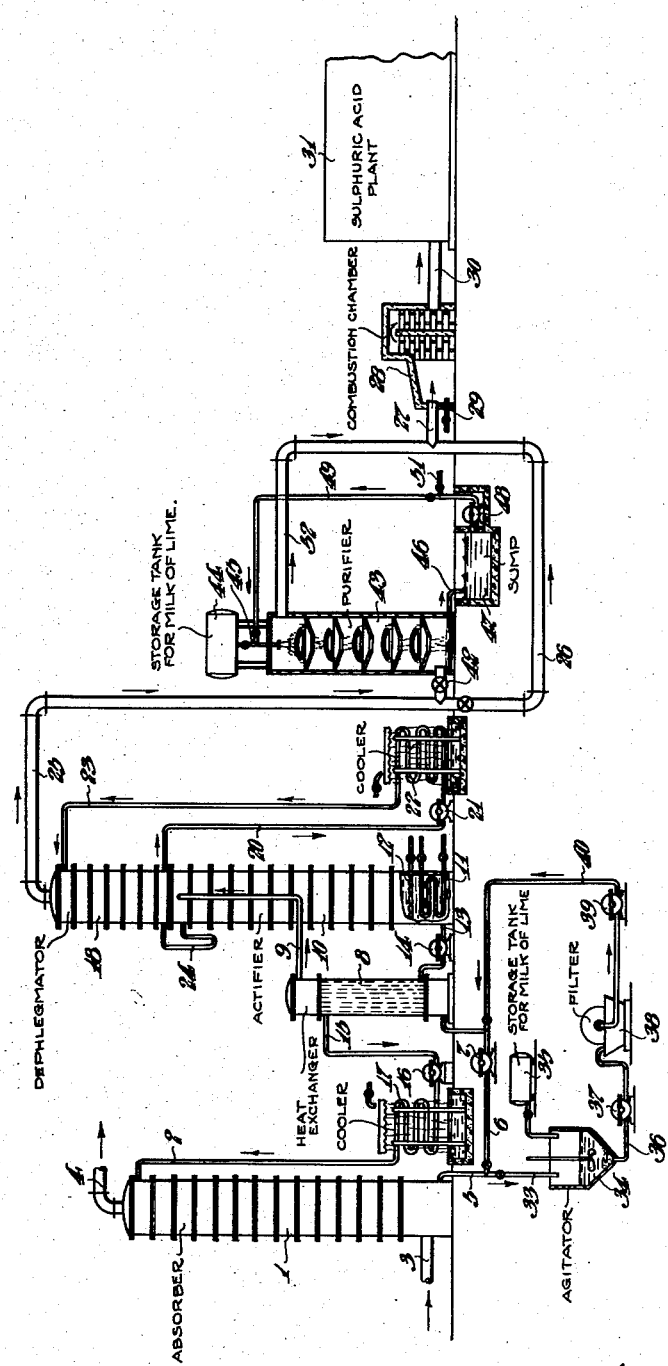

2,028,125

UNITED STATES PATENT OFFICE 2,028,125

PROCESS OF OBTAINING HYDROGEN SULPHIDE

Joseph A. Shaw, Pittsburgh, Pa., assignor to The Koppers Company of Delaware, a corporation of Delaware Application January 8, 1932, Serial No. 585,410

6 Claims. (Cl. 23—181)

My invention relates to hydrogen sulphide and has among its objects the provision of a process for obtaining hydrogen sulphide in substantially pure form, uncontaminated by other gases of a deleterious character and suitable for use for the preparation of sulphur dioxide to be used in the manufacture of sulphuric acid and for other purposes in which hydrogen sulphide of a high degree of purity is required.

In addition to the general object recited hereinabove my invention has for objects such other operative advantages and improvements as may hereinafter be found to obtain.

In my copending application Serial No. 570,961, filed October 24, 1931, of which this application is a continuation-in-part, there is described and claimed a process for the separation and purification of gaseous mixtures containing hydrogen sulphide and analogous acidic gases which comprises recirculating a solution containing a phenolate through a cycle comprising an absorption stage in which it is brought into contact with the gaseous mixture to be separated or purified and an actification stage in which impurities or constituents absorbed from said gaseous mixtures are liberated by heating the solution.

Many sources of hydrogen sulphide in gaseous form contain, in addition to hydrogen sulphide, varying amounts of carbon dioxide. While, from the standpoint of gas purification an incidental removal of carbon dioxide is ordinarily not objectionable, the presence of carbon dioxide may constitute a distinct disadvantage from the standpoint of recovering hydrogen sulphide. Thus where the hydrogen sulphide is to be burned to sulphur dioxide and the sulphur dioxide then employed for the manufacture of sulphuric acid, the presence of carbon dioxide is undesirable, probably for the reason that carbon dioxide tends in some way to reduce the activity of or destroy oxides of nitrogen necessarily present in the manufacture of sulphuric acid.

As carbon dioxide is of more strongly acidic character than hydrogen sulphide, it would ordinarily be expected that, when a mixture of these two gases is subjected to the action of an alkaline absorbent solution, absorption of carbon dioxide will take place in preference to absorption of hydrogen sulphide.

However, this is not the case. It has been found that a solution of the character indicated accomplishes a preferential absorption of $H_2S$ as compared with $CO_2$. This results in a marked increase in the $H_2S$ to $CO_2$ ratio of the gases liberated in the actification stage. In certain instances, the amount of $CO_2$ thus liberated falls to substantially nil, and there is recovered either substantially pure $H_2S$ or $H_2S$ so nearly pure as to make feasible the separation of small amounts of $CO_2$ therefrom.

Thus, when a gas containing substantially equal quantities of carbon dioxide and hydrogen sulphide was treated with a sodium phenolate solution or other solution capable of regeneration by heat in the absence of carbon dioxide, and was then heated to drive off the absorbed hydrogen sulphide, the gases liberated in the heating or actifying stage comprised not less than 90% $H_2S$ and not more than 10% $CO_2$.

When the gaseous mixture treated contained at least twice as much $H_2S$ as $CO_2$, the $H_2S$ driven off in the heating or actifying stage was substantially pure, little or no $CO_2$ being driven off at the same time.

Consequently one phase of my invention contemplates obtaining hydrogen sulphide in substantially pure form by washing a gaseous mixture containing relatively small amounts of carbon dioxide as compared to hydrogen sulphide and preferably at least twice as much hydrogen sulphide as any carbon dioxide which may be present with an absorbent liquid capable of regeneration by heating, preferably a phenolate solution of the character indicated hereinabove and as described in my copending application in which I have said: "The concentration of the solution may vary considerably, depending primarily upon the content of acidic gases and the degree of separation and purification desired. But in general I prefer to employ a liquid containing from 5% to 20% by weight of alkali-forming metal calculated as ROH (where R represents an alkali-forming metal), and containing a phenol or other auxiliary acidic substance either as such or in combination with all or a portion of the alkali-forming metal. The molar ratio of the alkali-forming metal present in the form of a compound or compounds having an alkaline reaction to the phenol or the phenolate radical or equivalent may be, for example, from 2:1 to 2:3, calculated as ROH and as free acid, respectively".

My invention further contemplates certain novel methods of obtaining hydrogen sulphide in substantially pure form in instances where the hydrogen sulphide liberated in the actification stage of a process of the character referred to hereinabove would otherwise contain undesirable amounts of carbon dioxide.

I have found that compounds of alkaline earth metals, such for example as calcium hydroxide, can be used to accomplish a preferential absorption or retention of carbon dioxide with little or no absorption or retention of hydrogen sulphide, and I utilize this discovery either by supplying a compound of this character, for example, calcium hydroxide, in the form of milk of lime, to the liquid employed for absorption of hydrogen sulphide at a point in the cycle subsequent to the absorption stage and prior to the actification stage, or by washing the gases evolved in the actification stage with a solution or suspension of an alkaline earth metal compound such as milk of lime, or other compound forming an insoluble carbonate, preferably used in such limited amount as to accomplish the removal or retention of substantially all carbon dioxide present without causing the removal or retention of an undesirable amount of the hydrogen sulphide present.

My invention also contemplates the removal from gases liberated in the actification stage or any other constituents such as phenol, the presence of which in the liberated hydrogen sulphide is deleterious or undesirable.

In order that my invention may be fully set forth and understood, I now describe, with reference to the accompanying drawing a preferred manner in which it may be practiced and carried out. In this drawing, The single figure is a more or less diagrammatic view, partly in elevation and partly in vertical section, of apparatus for carrying out the process of my invention.

Referring to the drawing, an absorbent solution, preferably a solution of an alkali metal phenolate although other alkaline absorbent liquids may be employed, is introduced to an absorber 1 through an inlet 2 located at or near the top thereof and flows downward through the absorber 1 in countercurrent to a rising flow of a gas or gaseous mixture introduced to the bottom of the absorber 1 through an inlet 3.

The gaseous mixture introduced through the inlet 3 to the absorber 1 is preferably one containing at least twice as much hydrogen sulphide as any carbon dioxide which may be present and may be obtained from any convenient source of such gas.

During the countercurrent passage of the absorbent liquid and the gaseous mixture the liquid absorbs hydrogen sulphide and may or may not absorb carbon dioxide, according to the amount of carbon dioxide present in the gaseous mixture. The treated gaseous mixture then escapes from the absorber 1 through an outlet 4 and the liquid containing absorbed hydrogen sulphide, and it may be carbon dioxide also, passes out of the bottom of the absorber 1 through a conduit 5.

Where the gaseous mixture treated in the absorber 1 contains insufficient carbon dioxide in proportion to the amount of hydrogen sulphide present to cause absorption of carbon dioxide in the absorber 1 to an undesirable extent, the liquid is then transferred through a valved conduit 6 in which is located a pump 7 to a heat exchanger 8 and then passes through a conduit 9 into the upper portion of an actifier 10.

The absorber 1 and the actifier 10 may both comprise gas-and-liquid contact apparatus of any desired type, although in the present instance bell-and-tray type columns of more or less conventional design are preferred, the apparatus illustrated in the drawing being of this character.

The liquid flows down through the actifier 10, at the bottom of which is located some suitable means for heating the solution reaching the bottom of the actifier. Such heating means may comprise, for example, an indirect steam coil 11 or a direct steam pipe 12, either one or both of which may be employed. Preferably the heating is carried to such extent that the liquid is carried to its boiling point and considerable quantities of steam are evolved which pass upward through the actifier 10.

Due to the heating and the countercurrent action of the steam, hydrogen sulphide absorbed in the absorber 1 is driven out of the liquid and the liquid is thereby regenerated for further absorption of hydrogen sulphide. The regenerated liquid is withdrawn from the bottom of the actifier 10 through a conduit 13 in which is located a pump 14 and is delivered by the latter to the heat exchanger 8 where it gives up a portion of its heat to the liquid entering the actifier 10. The partially cooled regenerated liquid then passes through a conduit 15 in which is located a pump 16 to a cooler 17 of conventional type and finally passes through the conduit 2 into the upper part of the absorber 1, thus completing the cycle of recirculation.

The vapors liberated from the absorber 1 pass upward through a dephelegmator 18 preferably located on top of or above the actifier 10 which is provided for the purpose of removing phenol volatilized in the latter. Portions of the condensed liquid reaching the bottom of the dephlegmator 18 may be withdrawn through a conduit 20 and passed by means of a pump 21 through a cooler 22 before being returned through a conduit 23 to the top of the dephlegmator, while excess condensate is returned through a sealed overflow 24 to the actifier 10. In this manner, or by means of any other suitable dephlegmating apparatus, substantially all phenol volatilized in the actifier 10 may be returned thereto and steam present in the vapors leaving the actifier 10 may also be condensed and returned to the latter.

The liberated gases leave the top of the dephlegmator 18 through a conduit 25 provided for the removal and collection of the same. When these gases contain unobjectionable amounts of carbon dioxide they may be permitted to pass directly through a valved conduit 26 and a conduit 27 to a combustion chamber 28 of any suitable type.

In the combustion chamber 28 the hydrogen sulphide is burned by means of air or oxygen introduced through a valved inlet 29 and the resultant sulphur dioxide gases pass through a conduit 30 to a sulphuric acid plant indicated by the reference numeral 31. As the details of sulphuric acid plants are well known, no detailed description of the same appears necessary.

Where carbon dioxide is present in the gaseous mixture treated in the absorber 1 to such extent as to cause continued absorption of carbon dioxide to an undesirable extent, the liquid withdrawn from the absorber 1 through the conduit 4 may be delivered through a valved conduit 33 to an agitator 34 and there mixed with milk of lime or other suitable alkaline earth metal compound supplied from a storage tank 35. Sufficient milk of lime is added to precipitate substantially all carbon dioxide which would otherwise be liberated in the actifier 10 and results in the precipitation of the carbon dioxide as calcium carbonate.

The liquid containing this precipitate is introduced through a conduit 36 in which is located a pump 37 to a filter 38 or other separating device where the insoluble carbonate precipitate is removed. Any suitable separating apparatus, such for example as a filter, a settling tank or a centrifuge, may be employed for this purpose. The clarified liquid or filtrate leaving the filter 38 is then delivered by a pump 39 through a conduit 40 to the heat exchanger 8 and eventually passes to the actifier 10 as before.

As an alternative method of procedure, I may permit any absorbed carbon dioxide to be volatilized in the actifier 10, the gases liberated in the actifier 10 being subsequently treated to eliminate carbon dioxide. For this purpose the hydrogen sulphide gases passing through the conduit 25 are conveyed through a valved branch conduit 42 to a purifier 43 through which circulates a solution or suspension of a suitable alkaline earth metal compound, such for example as milk of lime.

The purifier 43 may comprise gas-and-liquid contact apparatus of any suitable type for contacting a gas with a liquid suspension. Milk of lime or other suitable liquid is supplied to the purifier 43 from a suitable storage tank 44 through a valved conduit 45 and the wholly or partially spent liquid is removed from the purifier through a conduit 46 and delivered to a sump 47 from which it may be returned by means of a pump 48 through conduits 49 and 45 to the purifier 43 or may be removed through a valved branch conduit 51.

I may provide suitable means located in or associated with the sump 47 for filtering the solution or otherwise removing the insoluble precipitate of calcium carbonate which is formed by the action of the lime solution or suspension upon carbon dioxide in the purifier 43. The purified hydrogen sulphide passes from the purifier 43 through a conduit 52 and conduit 27 to the combustion chamber 28.

In adding the milk of lime or other precipitant to the agitator 34 or to the purifier 43, I prefer to add an amount of the same only sufficient to cause the precipitation of substantially all of the undesirable carbon dioxide which may be present. Some hydrogen sulphide may be retained but this amount can be reduced to a substantially negligible amount by thus limiting the amount of precipitant supplied.

It is of considerable advantage to have the gaseous mixture treated in the absorber 1 under more than atmospheric pressure as this facilitates absorption of hydrogen sulphide. Where this is the case suitable means for releasing the absorbent liquid from the absorber 1 without undesirable liberation of the gases under pressure can of course be provided.

As stated hereinabove, I prefer to employ as the absorbent solution recirculated between the absorber 1 and the actifier 9 a solution of an alkali metal phenolate, such a solution being capable of actification by heat in the absence of $CO_2$. I may also employ a solution of ammonium phenolate or a solution of an ammonium or alkali metal salt of any tar acid other than phenolate, or a mixture of such salts. A preferred solution comprises a solution ordinarily containing 10% by weight of NaOH and 15% by weight of a mixture of tar acids, principally phenol and cresol.

I may, however, employ other absorbent solutions such as a solution of sodium borate as set forth in the copending application of Gilbert A. Bragg, Serial No. 561,877, filed September 9, 1931, Patent 1,920,626.

My invention makes it possible to obtain hydrogen sulphide in substantially pure form in a simple and efficacious manner. The hydrogen sulphide thus recovered being free or substantially free from carbon dioxide and other impurities is suitable for the manufacture of sulphuric acid and other purposes in which hydrogen sulphide of a high degree of purity is required.

It will be apparent to those skilled in the art that my invention is not limited to the specific details of operation or to the specific apparatus described hereinabove by way of illustration but may variously be practiced and embodied within the scope of the following claims.

I claim as my invention:

1. In a process of preferentially absorbing $H_2S$ from gaseous mixture containing relatively small amounts of carbon dioxide as compared to hydrogen sulphide for recovery therefrom of substantially pure $H_2S$, the improvement which comprises effecting the preferential absorption of $H_2S$ from said gas by washing thereof with a predominantly phenolic solution of alkali-forming metal compound and tar acid, of about a 10% content by weight of the alkali and a 15% content by weight of tar acid and thereby selectively removing $H_2S$ preferentially from $H_2S$ and $CO_2$ in the gas, heating the spent solution to liberate $H_2S$ preferentially absorbed thereby and collecting the same, and thereby completing the recovering of the $H_2S$ of said gas as substantially pure $H_2S$ by preferential absorption thereof.

2. In a process of preferentially absorbing $H_2S$ from gaseous mixture containing at least twice as much hydrogen sulphide as carbon dioxide for recovery therefrom of substantially pure $H_2S$, the improvement which comprises effecting the preferential absorption of $H_2S$ from said gas by washing thereof with a predominantly phenolic solution of alkali-forming metal compound and tar acid, of about a 10% content by weight of the alkali and a 15% content by weight of tar acid and thereby selectively removing $H_2S$ preferentially from $H_2S$ and $CO_2$ in the gas, heating the spent solution to liberate $H_2S$ preferentially absorbed thereby, precipitating incidental $CO_2$ that may be present as an incident in the preferentially absorbed $H_2S$ and collecting the $H_2S$ separately therefrom, and thereby completing the recovering of the $H_2S$ of said gas as substantially pure $H_2S$ by preferential absorption thereof.

3. In a process of preferentially absorbing $H_2S$ from gaseous mixture containing relatively small amounts of carbon dioxide as compared to hydrogen sulphide for recovery therefrom of substantially pure $H_2S$, the improvement which comprises effecting the preferential absorption of $H_2S$ from said gas by washing thereof with a predominately phenolic solution of about a 10% content by weight of NaOH and a 15% content by weight of tar acid and thereby selectively removing $H_2S$ preferentially from $H_2S$ and $CO_2$ in the gas, heating the spent solution to liberate $H_2S$ preferentially absorbed thereby and collecting the same, and thereby completing the recovering of the $H_2S$ of said gas as substantially pure $H_2S$ by preferential absorption thereof.

4. In a process of preferentially absorbing $H_2S$ from gaseous mixture containing at least twice as much hydrogen sulphide as carbon dioxide for recovery therefrom of substantially pure $H_2S$, the improvement which comprises effecting the preferential absorption of $H_2S$ from said gas by washing thereof with a predominantly phenolic solution of about a 10% content by weight of NaOH and a 15% content by weight of tar acid and thereby selectively removing $H_2S$ preferentially from $H_2S$ and $CO_2$ in the gas, heating the spent solution to liberate $H_2S$ preferentially absorbed thereby, precipitating incidental $CO_2$ that may be present as an incident in the preferentially absorbed $H_2S$ and collecting the $H_2S$ separately therefrom, and thereby completing the recovering of the $H_2S$ of said gas as substantially pure $H_2S$ by preferential absorption thereof.

5. In a process of manufacturing sulphuric acid the improvement which comprises preferentially absorbing $H_2S$ from gas mixtures containing relatively small amounts of carbon dioxide as compared to hydrogen sulphide by washing the gas mixture with a predominantly phenolic solution of alkali-forming metal compound and tar acid, of about a 10% content by weight of the alkali and a 15% content by weight of tar acid, heating the spent solution to liberate the $H_2S$ preferentially absorbed thereby as substantially pure $H_2S$, oxidizing the sulphur of said $H_2S$ to sulphur dioxide, and converting said sulphur dioxide to sulphuric acid in the presence of oxides of nitrogen.

6. In a process of manufacturing sulphuric acid the improvement which comprises preferentially absorbing $H_2S$ relative to $CO_2$ from gas mixtures containing relatively small amounts of carbon dioxide as compared to hydrogen sulphide by washing the gas mixture with a predominantly phenolic solution of alkali-forming metal compound and tar acid, the molar ratio of said alkali-forming metal to said tar acid in the solution being from 2:1 to 2:3, calculated as ROH (where R represents alkali-forming metal) and tar acid, heating the spent solution to liberate the $H_2S$ preferentially absorbed thereby as substantially pure $H_2S$, burning the $H_2S$ to sulphur dioxide, and catalytically converting said sulphur dioxide to sulphuric acid.

JOSEPH A. SHAW.